(12) United States Patent
Clark

(10) Patent No.: US 12,349,626 B2
(45) Date of Patent: Jul. 8, 2025

(54) PREDICTIVE POWER BOOST DEMAND SYSTEM FOR AN AGRICULTURAL VEHICLE

(71) Applicant: DEERE & COMPANY, Moline, IL (US)

(72) Inventor: Scott N. Clark, Bettendorf, IA (US)

(73) Assignee: Deere & Company, Moline, IL (US)

( * ) Notice: Subject to any disclaimer, the term of this patent is extended or adjusted under 35 U.S.C. 154(b) by 959 days.

(21) Appl. No.: 17/391,146

(22) Filed: Aug. 2, 2021

(65) Prior Publication Data
US 2023/0029905 A1    Feb. 2, 2023

(51) Int. Cl.
| | | |
|---|---|---|
| *A01D 41/127* | (2006.01) | |
| *A01D 90/10* | (2006.01) | |
| *B60W 30/14* | (2006.01) | |
| *B60W 50/14* | (2020.01) | |
| *B65G 67/22* | (2006.01) | |
| *A01D 43/07* | (2006.01) | |

(Continued)

(52) U.S. Cl.
CPC ......... *A01D 41/1274* (2013.01); *A01D 90/10* (2013.01); *B60W 30/143* (2013.01); *B60W 50/14* (2013.01); *B65G 67/22* (2013.01); *A01D 43/07* (2013.01); *B60W 2050/146* (2013.01); *B60W 2300/158* (2013.01); *F02D 41/0205* (2013.01); *F02D 41/021* (2013.01); *F02D 41/083* (2013.01); *F02D 2250/18* (2013.01)

(58) Field of Classification Search
CPC ...... F02D 29/02; F02D 41/04; F02D 2200/64; A01D 69/00
See application file for complete search history.

(56) References Cited

U.S. PATENT DOCUMENTS

| | | | | |
|---|---|---|---|---|
| 4,216,641 A | * | 8/1980 | Koch | .................... A01D 43/105 56/14.4 |
| 5,878,557 A | | 3/1999 | Wyffels et al. | |

(Continued)

FOREIGN PATENT DOCUMENTS

EP    3259976 A1    12/2017

OTHER PUBLICATIONS

CLAAS KGaA mbH, Deutschland; Jaguar Dynamic Power; jaguar800.claas.com; Dec. 2020; pp. 1-77.

*Primary Examiner* — John Kwon
(74) *Attorney, Agent, or Firm* — Taft Stettinius & Hollister LLP; Stephen F. Rost

(57) ABSTRACT

A harvesting machine for harvesting a crop and discharging the harvested crop to an offboard container, such as a wagon or a truck, or the ground. The harvesting machine includes a power system to provide power, a crop harvester powered by the power system, and a crop discharging system to discharge crop from an onboard storage container to the offboard location, typically a container. During a harvesting operation, the harvesting machine operates at a nominal maximum power, typically a current power consumption. The nominal maximum power is reduced in anticipation of a predicted power used for discharging the harvested crop from the onboard storage container. The current power consumption for harvesting is adjusted and allocated by the predicted power to make available power for the crop discharging system. Once crop is discharged using the discharging power, the harvesting machine returns to the nominal maximum power.

18 Claims, 10 Drawing Sheets

(51) Int. Cl.
*F02D 41/02* (2006.01)
*F02D 41/08* (2006.01)

(56) References Cited

U.S. PATENT DOCUMENTS

| | | | |
|---|---|---|---|
| 8,352,155 B2 | 1/2013 | Schindler et al. | |
| 11,178,817 B2* | 11/2021 | Mayerle | A01D 41/1243 |
| 2003/0075145 A1 | 4/2003 | Sheidler et al. | |
| 2008/0209878 A1* | 9/2008 | Farley | A01D 41/127 |
| | | | 701/50 |
| 2010/0299048 A1 | 11/2010 | Schindler et al. | |
| 2023/0029905 A1* | 2/2023 | Clark | B65G 67/22 |

* cited by examiner

PREDICTIVE POWER BOOST DEMAND SYSTEM FOR AN AGRICULTURAL VEHICLE

FIELD OF THE DISCLOSURE

The present disclosure relates to an agricultural vehicle, and more particularly, to a crop harvester having varied power demands during the harvesting of a crop.

BACKGROUND

Agricultural equipment, such as a tractor or a self-propelled harvester, includes mechanical systems, electrical systems, hydraulic systems, and electro-hydraulic systems.

One type of agricultural harvester includes a self-propelled combine harvester, having different sections for cutting crop and moving the crop through the harvester. A header for an agricultural combine harvester is arranged to be moved in a forward direction over a field. The header comprises a laterally extending frame supporting a laterally extending cutter bar. Draper conveyers, located at the header, include a draper belt having a feeding direction from an outer side end towards a center of the header. A central conveyor, also called a center draper belt conveyor, is disposed between the inner ends of the left and right draper belt conveyors to receive cut crop material and convey it rearward through the central aperture. The central aperture directs harvested grain, for instance to a thresher where the grain is separated from the plant stalk and delivered to an onboard storage unit. When the onboard storage unit is full, the grain is unloaded to a wagon or tank.

Another type of harvester is configured to harvest corn. The corn harvester includes a corn header having a plurality of cones separated by channels that receive stalks of corn. The channels direct the stalks of corn to a gathering chain that strips the heads of corn from the stalks, which fall to the ground. The heads of corn are directed to a central aperture and the kernels of corn, which are removed from the corn head, are stored in an onboard storage unit for later unloading from the harvester.

When harvesting cotton, cotton from cotton plants is harvested by a self-propelled mobile cotton harvester, which includes a header that engages the cotton plant to remove the cotton from the field. The removed cotton is delivered to a relatively large basket that receives and holds the harvested cotton. Many known cotton harvester baskets include apparatus for compacting the cotton into a round bale primarily to increase the amount of cotton, which can be formed into a bale. Once the bale is sufficiently large, it is discharged.

Both the self-propelled grain harvester and the self-propelled cotton harvester can include a cab where an operator is located to operate and/or monitor the operation of harvester. The cab includes operator controls, often including a display, to provide the operator with harvester status as well as to provide operator controls for adjusting operating conditions of the harvester.

The grain harvester and cotton harvester each include a vehicle propulsion system, including an engine coupled to a transmission, which is in turn coupled to a drive train, as is understood by those skilled in the art.

Many harvesting vehicles, including the grain harvesting and cotton harvesting machines, drive hydraulic pumps that act as one of the engine power consumers. In the grain harvester, an auger is used to unload the threshed grain from the onboard storage tank. When the auger is actuated, power is required to unload the grain off-board. In the cotton harvester, or cotton picker, cotton is collected and formed into the large bale. Once the bale forming is complete, it is ejected from the cotton harvester, by a bale handler and unloaded to either to the ground or to a wagon or other container.

Both types of harvesters, and others, require a certain amount of power during the harvesting operation. Typically, the primary power consumers are the drives for processing the crop and conveyance of the crop to the onboard storage unit. Once the crop material has been harvested to the point where the crop must be unloaded from the harvester, additional power is required for the unloading process. There is, however, a limited amount of power generated by the power systems on the vehicles. To provide the power for the unloading process, the harvester is harvesting at a power less than a maximum amount of power available, such that an additional amount of power is supplied for the unloading process. In this arrangement, however, reduced power during harvesting reduces the efficiency of the harvesting process.

What is needed therefore is system and method to utilize the maximum power generated by the engine during a harvesting operation, while managing the power required for unloading of the crop.

SUMMARY

In one embodiment, there is provided a method of controlling work machine power of a work machine during a harvesting operation for harvesting a crop and a delivering the harvested crop to an external crop container, wherein the work machine includes an engine, a crop harvester, an onboard crop storage container, and a crop discharging system. The method includes: monitoring crop harvester power delivered by the engine to operate the crop harvester during the harvesting operation to provide harvested crop; while monitoring the crop harvester power, determining a discharging power required by the crop discharging system to discharge the harvested crop to the external crop container; modifying and allocating the crop harvester power based on the determined discharging power; and delivering the discharging power to the crop discharging system to discharge the crop from the onboard crop storage container to the external crop container.

In some embodiments the method further includes determining harvested crop remaining to be discharged from the onboard crop storage container, and reducing the discharging power and increasing the crop harvester power based on the remaining harvested crop to be discharged.

In some embodiments the method further includes prior to delivering the discharging power required to discharge the harvested crop to the external crop container, reducing the crop harvester power as the discharging power is increased.

In some embodiments the method further includes determining the discharging power required by the discharging system includes determining an amount of crop in the onboard crop storage container.

In some embodiments the method includes wherein the delivering the discharging power to the crop discharging system includes reducing the crop harvester power prior to increasing the discharging power.

In some embodiments the method includes wherein the modifying the crop handler power includes reducing the crop handler power over a period of time and increasing the discharging power once the reduced harvester power reaches a determined value.

In some embodiments the method includes wherein the modifying the crop handler power includes modifying the ground speed of the vehicle to increase the amount of power available for the discharging power.

In some embodiments the method includes wherein the modifying the ground speed of the vehicle includes modifying the ground speed of the vehicle over the period of time.

In some embodiments the method includes wherein the modifying the ground speed of the vehicle includes manually modifying the ground speed of vehicle with a user control.

In some embodiments the method includes wherein the manually modifying the ground speed includes displaying a target ground speed or power on a user interface and manually modifying the ground speed to the displayed target ground speed.

In some embodiments the method includes wherein the modifying the ground speed of the vehicle includes automatically modifying the ground speed of the vehicle over the period of time.

In another embodiment, there is provided a work machine including a supporting structure, a harvesting assembly coupled to the supporting structure, and an onboard container coupled to the supporting structure and configured to contain harvested crop harvested by the harvesting assembly. A crop discharging system is disposed at the onboard container and is configured to discharge harvested crop from the onboard container. An engine is configured to provide harvesting power to the harvesting assembly and to provide discharging power to the crop discharging system. A controller is operatively connected to the harvesting assembly and to the discharging system. The controller includes a processor and a memory, wherein the memory is configured to store program instructions and the processor is configured to execute the stored program instructions to: monitor crop harvester power delivered by the engine to operate the crop harvester during the harvesting operation to provide harvested crop; while monitoring the crop harvester power, determine a discharging power required by the crop discharging system to discharge the harvested crop from the onboard container; modify the crop harvester power based on the determined discharging power; and deliver the discharging power to the crop discharging system to discharge the crop from the onboard container.

In some embodiments, the work machine includes wherein the processor is further configured to determine harvested crop remaining to be discharged from the onboard container, and reduce the discharging power and increase the crop harvester power based on the remaining harvested crop to be discharged.

In some embodiments, the work machine includes wherein the processor is further configured to prior to deliver the discharging power required to discharge the harvested crop, reduce the crop harvester power as the discharging power is increased.

In some embodiments, the work machine further includes wherein the deliver the discharging power to the crop discharging system includes reducing the crop harvester power prior to increasing the discharging power.

In some embodiments, the work machine further includes wherein the modify the crop handler power includes reduce the crop handler power over a period of time and increase the discharging power once the reduced harvester power reaches a determined value.

In some embodiments, the work machine includes wherein the modify the crop handler power includes modify the ground speed of the vehicle to increase the amount of power available for the discharging power.

In some embodiments, the work machine includes wherein the modify the ground speed of the vehicle includes modify the ground speed of vehicle manually with a user control.

In some embodiments, the processor determines discharging power based map data provided by systems located on the harvester or remote systems such as a GPS system.

In a further embodiment, there is provided a method of controlling work machine power of a work machine during a harvesting operation for harvesting a crop and discharging the harvested crop from the work machine, wherein the work machine includes an engine, a crop harvester, an onboard crop storage container and a crop discharging system. The method includes: identifying a nominal maximum power for powering the work machine during the harvesting operation; identifying a discharging power required by the crop discharging system to discharge the harvested crop from the work machine; reducing the nominal maximum power to a predetermined reduced harvesting power in response to a predicted actuation of the crop discharging system; and actuating the crop discharging system to discharge crop from the work machine.

In some embodiments, the method includes wherein the reducing the nominal power includes reducing the nominal power automatically or in response to actuation of an operator input device.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
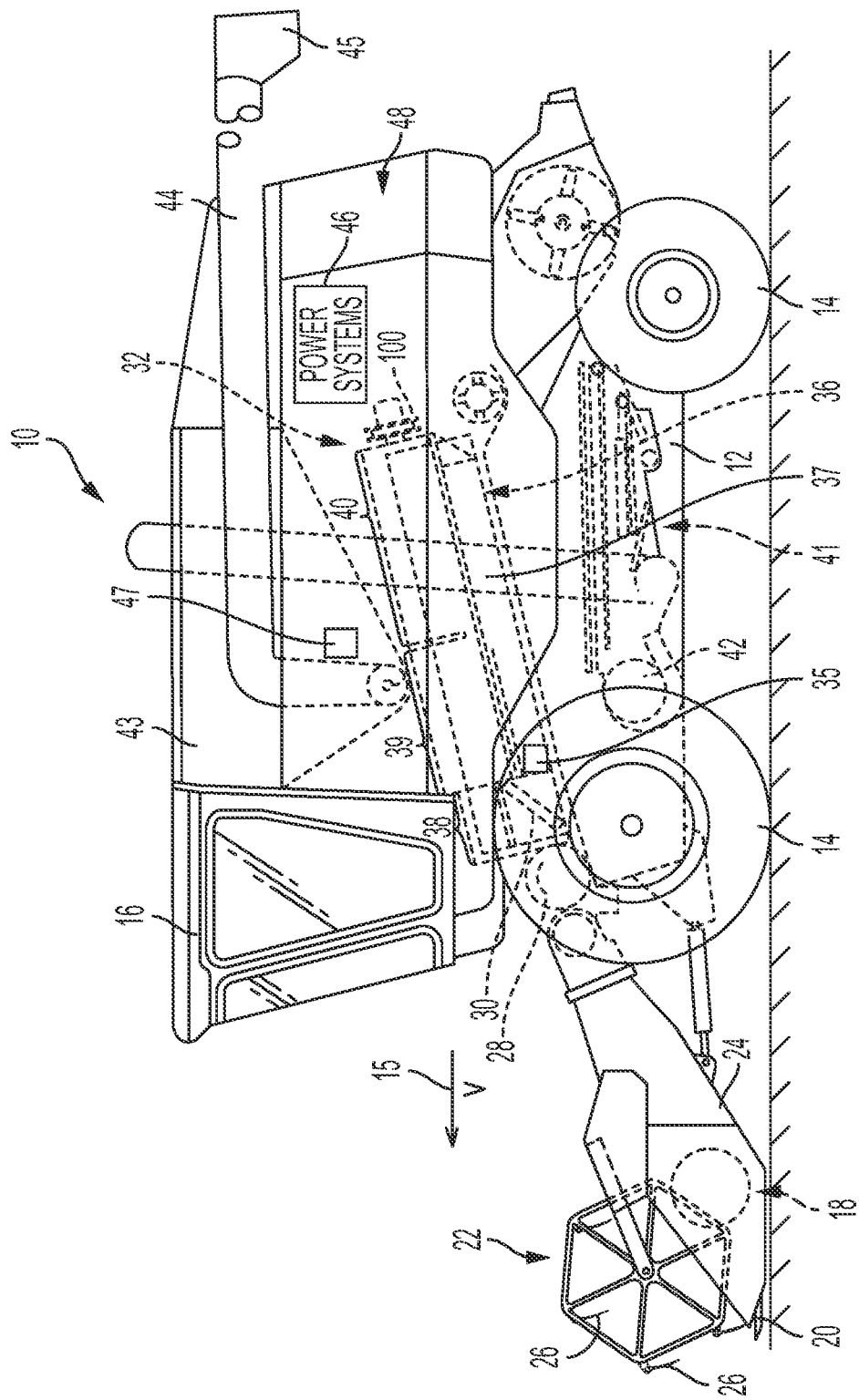
FIG. 1 is an elevational side view of an agricultural combine harvester.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates one embodiment of an agricultural combine harvester 10 including a chassis 12 with wheels 14 in contact with the ground. Wheels 14 are coupled to the chassis 12 and are used for propulsion of the combine 10 in a forward operating or travelling direction 15. Surface engaging members, other than wheels, are contemplated, such as treads. The operation of the combine 10 is controlled from an operator's cab 16. The operator's cab 16, in different embodiments, includes one or more controls located at an operator input device 17, see FIG. 2, for controlling the operation of the harvester 10. A draper header 18 is disposed at a forward end of the harvester 10 and includes a cutting knife or cutterbar 20 to cut crop being harvested. The cut crop includes any variety and types of different crops including wheat, soybeans, sorghum, barley, and other grains. At substantially the same time the grain is cut, a pickup reel assembly 22, rotates as understood by those skilled in the art, to move or force the cut crop toward a slope conveyor 24. The pickup reel assembly 22 includes a plurality of fingers 26. The fingers 26 lift and move the cut crop over the cutterbar 20, as well as to comb through the cut crop to provide a degree of separation of the crop. The cut crop is conducted by a guide drum 28 and directed by the slope conveyor 24 to an inlet transition section 30, i.e. feederhouse. The inlet transition section 30 directs the cut crop to an axial harvested crop processing arrangement 32.

The crop processing arrangement 32 includes, in one or more embodiments, rotor housing 36 and a rotor 37 located inside the housing 36. A rotor pressure sensor 35 is located at the rotor 37 to determine a flow of harvested crop being delivered from the crop processing arrangement 32. The rotor 37 comprises a drum 100 to which crop processing elements for an infeed section 38, threshing section 39, and separating section 40 are affixed. The infeed section 38 is at the front of the axial crop processing arrangement 32. Longitudinally downstream and rearward from the infeed section 38 are threshing section 39 and separating section 40. The portion of the drum 100 for the infeed section 38 is typically frusto-conical in shape, extending rearwardly toward the threshing section 39 of the drum 100, although it can also be cylindrical in shape. The threshing section 39 can also be frusto-conical in shape, although in some arrangements of the present invention, the threshing section 39 has a front portion that is frusto-conical in shape, and a rear portion that is cylindrical in shape. The rear portion of the axial crop processing arrangement 32 is comprised of the separating section 40 of the drum 100, which is cylindrical in shape.

Grain and chaff that fall through the crop processing arrangement may be directed to a cleaning system 41 with a blower 42. The cleaning system 41 removes the chaff and guides the clean grain to an elevator for clean grain (not shown). The elevator deposits the clean grain into a tank 43, i.e. an onboard container or tank, where it is stored temporarily. The deposited grain is unloaded by a conveyor 44 having an outlet 45 to a wagon, trailer, or truck, or other off-board container. The conveyor 44 is movable from an unloading position, as illustrated in FIG. 1, to a loading position, described later herein. A position sensor 47 is located, in one embodiment, next to the conveyor 44 to determine the location of the conveyor. In one or more embodiments, the conveyor 44 is an auger. The position of the auger 44 while the harvester 10 is harvesting is illustrated in FIG. 1. When the harvester 10 is placed in the unloading mode, the auger 33 is moved to a position extending from, and inclined with respect to, the traveling direction 15. The inclined position is often perpendicular to the traveling direction 15. As the auger position is changed, the position sensor 47 provides a signal to a controller 49 indicating the auger position in the harvesting position or the unloading position. In one or more embodiments, the controller 49 is one component of an electronic control unit including additional components and parts as is understood by one skilled in the art.

While the harvester of FIG. 1 is configured for harvesting a particular type of grain, i.e. wheat, the present disclosure is includes a harvesting system and process for harvesting all types of grains, including corn. Differences in grain types require different amounts of power for harvesting and for unloading, where the power required depends on the properties the individual kernels of grain, for instance moisture, geometrical shape, size, density, and weight. For instance, when comparing the harvesting of corn to the harvesting of wheat, corn harvesting may require more power than wheat harvesting. In addition, the unloading of corn from the onboard storage container typically occurs more often, due to increased crop yields of corn relative to wheat. Consequently, the present disclosure applies to all types of crop harvesters. Cotton harvesters and pickers are also contemplated.

A plurality of power systems 46 are supported by the chassis 12 and located within a housing 48 of the harvester 10. The harvester 10 includes different power systems including mechanical, hydraulic, pneumatic, electric, and electronic, for propelling the harvester 10 and for controlling various processing equipment and systems as is understood by those skilled in the art. Such power systems include an engine 50 (see FIG. 2) providing power for the vehicle, including powering a transmission system. The engine 50 also provides a known input power required for auxiliary power systems 52, such as grain handling, and cotton module building systems, if the harvester is for cotton. The engine 50 provides a generally constant amount of power during a harvesting process. The systems used during harvesting are also known as power sinks. Besides the engine power being utilized for harvesting process control, engine power is also provided to control an environment of the cab 16, using dedicated auxiliary power systems 52, for heating and air conditioning, as is known by those skilled in the art.

The power systems 46 also provide power for those systems that do not continuously require power, but are considered to auxiliary power systems, i.e. unloading grain from the harvester with an auger or a module build/ejection system for module building of cotton or bale building of hay. Such systems require power that is anticipated or predictable based on an amount of harvested crop, such as grain or cotton, which once harvested, is unloaded by the harvester to an offboard container such as a truck, wagon, bin, ground, or other location. Once unloaded, the crops are delivered for transport to or use by a customer or other user of the crops.

Crop harvester power required for harvesting crop is based on the speed of the harvester as well as the harvesting assemblies used to harvest the crop. The power being provided for unloading the harvested product from the harvester is considered to be an anticipated or predictable power that is not required until activation of an unloading system 54 is required. The anticipated power, when delivered, is an unloading power used to discharge or unload the harvested product. The unloading system 54 includes the position sensor 47. As described herein, moving harvested crop from the harvester of any type shall be considered as a "discharge" of crop from the harvester.

A traditional combine grain harvester may include a 'power boost' function that uses available reserve power only made available when the combine's grain auger is being used. To ensure that the reserve power is available, the harvester typically does not operate the engine at a maximum available power while harvesting to insure that the reserve power is available when needed. When unloading crop, the reserve power is delivered to the unloading system that offsets the power required by the harvester's grain handling system. Reducing the power provided by the engine during a harvesting operation, however, in anticipation of an unloading operation, reduces the overall productivity of the harvesting operation. The reduced efficiency is typically a reduction in the speed of the harvester as it travels through the field being harvested. In order to better utilize the maximum available power of the engine, known systems leverage a power boost curve, instead of the nominal curve used during the harvesting of crop. While this traditional system of providing a "power boost" function provides for unloading of grain which harvesting, such a system is relatively inefficient as the harvester's available power is not fully utilized either during the harvesting operation or the harvesting while unloading operation.

In other examples of traditional harvester power management, a maximum power curve is provided with no additional reserve for power boost. This system, however presents a problem when an unloading-on-the-go scenario is presented, i.e. grain is unloaded as the harvester continues to harvest grain. The instant power demand results in an insufficient amount of power available to combat the unloading power requirement. This results in a significant reduction of performance as no power "boost" can be provided by the engine. Additionally, when power is utilized with no boost, the power bulge is sacrificed as the additional request for power slows engine speed, creates inefficiency in the separating and cleaning system, and poses operator drivability discomfort or even belt and hardware downtime failures. As described herein, "boost" is the delta (difference) between a nominal power curve and a max power curve at the same speed of the harvester. "Bulge" is the delta between different powers along the same power curve.

To combat this problem, the present disclosure incudes a process and apparatus that utilizes the harvesting machine's current performance. In one embodiment, the known system power requirements are considered in combination with the power required for unloading harvested crop to provide a "target" speed. The target speed is the speed at which the harvester continues to harvest crop while unloading the harvested crop at the same time. While the target speed is less than the operating harvest speed, the target speed enables unloading of crop without a detrimental reduction in harvest speed. The "target" speed is determined prior to activating the unloading system and is used to adjust the harvester speed. The target speed enables the harvester to provide a "target" power which is made available to unload the harvested crop.

In different embodiments, the target speed is: i) presented to the operator at the operator input device 17 or ii) the speed of the harvester is adjusted automatically to the "target speed". In the manual case, the display 60 presents the target speed to the operator who then manually adjusts the harvester to the target speed. In another embodiment, the "target" speed is incorporated into an automated drive system for the vehicle which identifies a time at which unloading of harvested crop will begin prior to the unloading device, i.e. auger, being deployed. In the automated case, the harvester is harvesting at currently known and provided "nominal" power, but will ramp down the harvester speed to acquire the power target prior to the event. In one embodiment, maximum harvesting power, i.e. the nominal power, is provided continuously during a harvesting operation, but is reduced prior to an unloading operation.

The system relies on one or more predictive inputs to determine the target speed and the target power. The predictive inputs include, but are not limited to, crop area harvested with yield map data, grain weight from active yield calibration system(s), or grain tank 45 level of ¾ full or greater.

Figure 2:
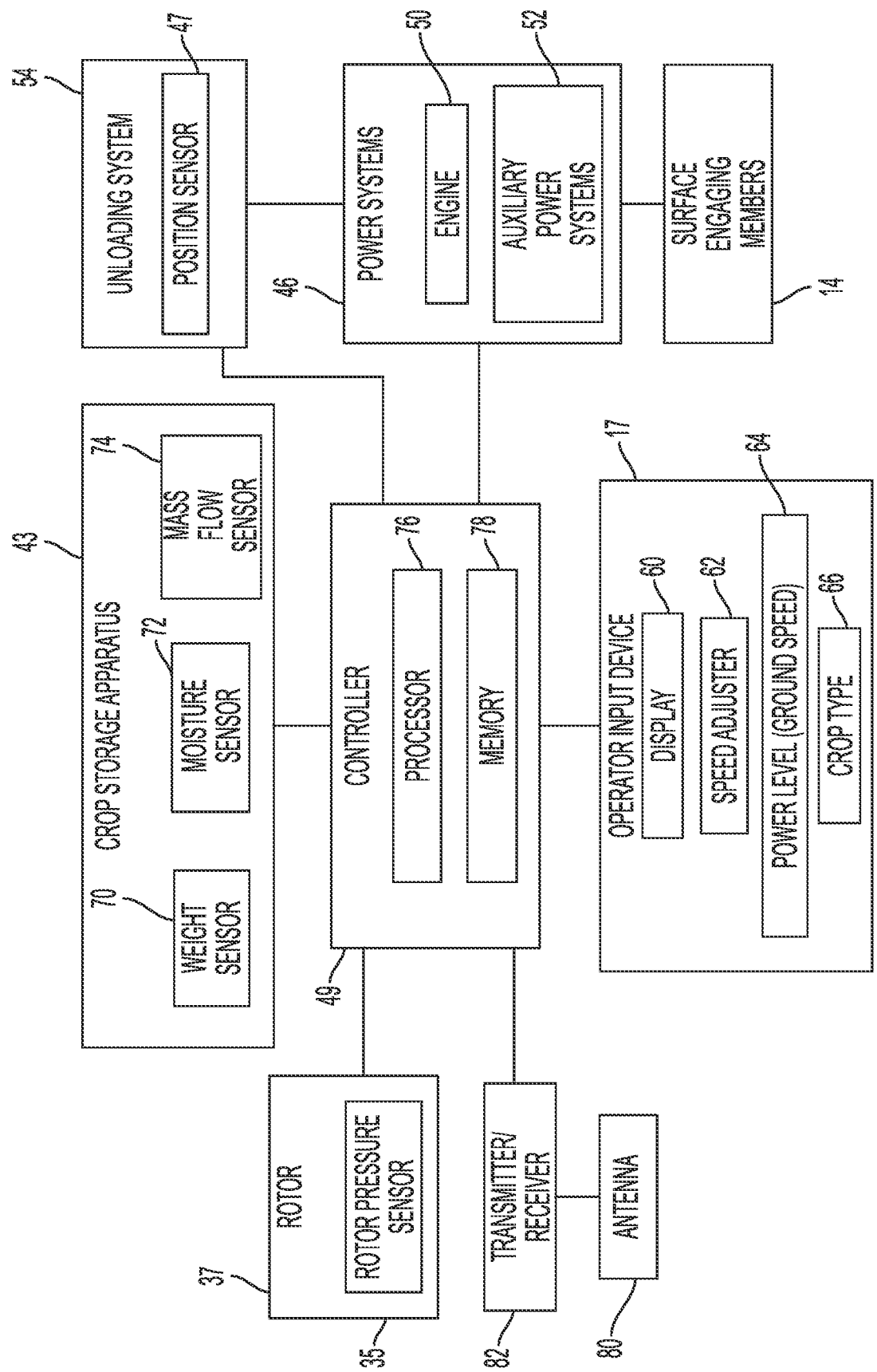
FIG. 2 is a block diagram of various hardware an agricultural harvesting machine.

As seen in FIG. 2, the harvester 10 includes the rotor pressure sensor 35 disposed at a transition between the inlet transition section 30 and the rotor 37, which determines the total crop being processed. The rotor pressure sensor 35 determines the flow, i.e. speed, at which the crop is being harvested. The rotor pressure sensor is used to determine crop flow biomass and the power required for the threshing system.

The tank 43, identified as a crop storage apparatus in FIG. 2, in one or more embodiments, includes a weight sensor 70, a moisture sensor 72, and a mass flow sensor 74. Each of the sensors 70, 72, and 74 is used to determine the characteristics of the grain located within the tank 43. Signals from these sensors are used by the controller 49 as inputs to determine at what point the tank is sufficiently full to be unloaded by the auger 44. The mass flow sensor 74 is configured to determine the flow rate of grain being deposited into the tank 43, such as by grain level within the tank 43. In other embodiments, a sensor measures discharged crop flow or power requirements needed to discharge the crop.

The controller 49, in different embodiments, is a single controller or a plurality of controllers operatively coupled to one another. The controller 49 includes one or both of hardwired connection or wireless connection (i.e. operatively coupled) to other components of the work machine 10, such as the engine 50, auxiliary power systems, 52, sensors 35, 47, 70, 72, 74 and the operator input device 17. The controller 49, in different embodiments, is operatively coupled to such components via Wi-Fi, Bluetooth, or other known means of wireless communication. Thus, the controller 49 is housed by the work machine 10 or positioned remotely, away from the work machine 10.

The controller 49, in different embodiments, includes a computer, computer system, or other programmable devices. The controller 49 includes one or more processors 76 (e.g. microprocessors), and an associated memory 78, which can be internal to the processor or external to the processor. The memory 78 can include random access memory (RAM) devices comprising the memory storage, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to controller 49. The mass storage device can include a cache or other dataspace, which can include databases. Memory storage, in other embodiments, is located in the "cloud", where the memory is located at a distant location, which provides the stored information wirelessly to the controller 49 through an antenna 80, typically supported by the housing 48 of the vehicle that receives or transmits information from the distant location with a transmitter/receiver 82. The transmitter/receiver 82 is operatively connected to the controller 49.

The controller 49 executes or otherwise relies upon computer software applications, components, programs, objects, modules, or data structures, etc. Software routines, resident in the included memory 76 or other memory, are executed in response to the signals received from the sensors as well as information received from the transmitter/receiver. In other embodiments, the computer software applications are located in the cloud. The executed software includes one or more specific applications, components, programs, objects, modules or sequences of instructions typically referred to as "program code". The program code includes one or more instructions located in memory and other storage devices that execute the instructions that are resident in memory, which are responsive to other instructions generated by the system, or which are provided by the operator input device 17. The processor is configured to execute the stored program instructions.

The operator input device 17 includes a display 60, a speed adjuster 62, a power level indicator 64, and a crop type selector 66. The display 60, in one embodiment, is used to manually maneuver the machine to the target speed. In another embodiment, the maneuvering of the machine to the target speed is incorporated into an automated drive system for the vehicle to allow it to identify: i) when the unloading auger is out, or ii) the machine is harvesting at the "nominal" power, and begin to ramp down speed to acquire the power target prior to the event. Crop area harvested with yield map data, grain weight from active yield features, or grain tank level of ¾ full or greater can also be used as predictive inputs. In one embodiment, the speed adjuster 62 is a hydro handle that adjusts machine ground speed to the constant speed operation of harvesting.

In one or more embodiments, map data is used to determine the nominal power required to harvest the crop. This map data is used to determine the load experienced by the harvester during harvesting, and this map-based load is used by the controller 49 to predict when to ramp down vehicle speed in anticipation of an unloading event. In one embodiment, site map data is stored in the memory 78 and includes a starting profile map that includes terrain information that includes slope and/or height information used to identify the harvesting power needed for the particular terrain. This map, detailing an unharvested condition of a field, further includes in one or more embodiments, data that affects harvesting power such topography, soil type, planted crop inputs, vegetative index, crop moisture, and biomass and/or crop density. These inputs are available on board the harvester from technological inputs provided by vehicle sensors such as 2D and 3D sensors that examine the terrain as well as map based farming applications, such as planters, nutrient applicators, drones, geographic information systems (GIS) data, prior years' harvest record data, and other sources of data that is used to determine harvesting power required.

In these and other embodiments, the map data includes real time updated map data that tracks the location of the vehicle within the field being harvested, as well as an amount of time that has transpired from the start of the harvesting process or a return to the harvesting process once unloading has occurred. By knowing the amount of time that has transpired and the amount of crop harvested as well as the harvesting power required, an unloading event is predicted, and is used to initiate the unloading. In addition, once the unloading event has concluded, the real time updated map data between the last unloading event to the next unloading event is predicted. This data, in different embodiments, is based on vehicle speed, terrain information, and crop information. Vehicle speed information is based on vehicle speed information determined on the harvester itself, such as wheel speed sensor inputs, or is determined by a GPS system as is understood by those skilled in the art.

The predictive inputs, such as those from the sensors, the map data, as well as a current harvesting ground speed and the power required to maintain the vehicle and its included power systems 46 are used to control the vehicle speed during harvesting. In addition, the predictive inputs are used in different embodiments to prepare for unloading the grain from the tank 43 when the vehicle is stationary, unloading the tank 43 while the vehicle is moving, and returning the vehicle to a harvesting speed and related power systems for harvesting after the tank is unloaded. In one embodiment, the vehicle is operated at a first harvesting speed, typically a "nominal" maximum speed considered to be appropriate for the vehicle, and field and grain conditions. The "nominal" maximum speed is based on a "nominal" maximum power. This harvesting power, required to operate the vehicle during harvesting without unloading, is a first harvesting speed determined by the controller. The controller 49, which monitors the grain level in the tank, also determines a time in the future at which the grain should be unloaded. Using this information, a reduced speed of the vehicle, a second harvesting speed, is determined based on the unloading power required. To unload the crop, the speed of the vehicle is reduced from the first harvesting speed to the second harvesting speed, to reduce the harvesting power, and the extra power available is directed to the unloading of the grain. In this way, nominal maximum power is used for both harvesting alone and harvesting while unloading crop. Once the unloading of crop is complete, the nominal maximum power is used solely for the harvesting of crop. In this way, the vehicle power systems operate at a maximum power during both harvesting and unloading, but the maximum power is directed from powering only harvesting vehicle functions to a combination of harvesting at a reduced vehicle speed and the unloading of grain. The feature enables a greater 'nominal' max power for normal harvesting conditions without sacrificing the power boost necessary to maintain vehicle drivability when activating the systems generally associated with boost power demand.

Figure 3:
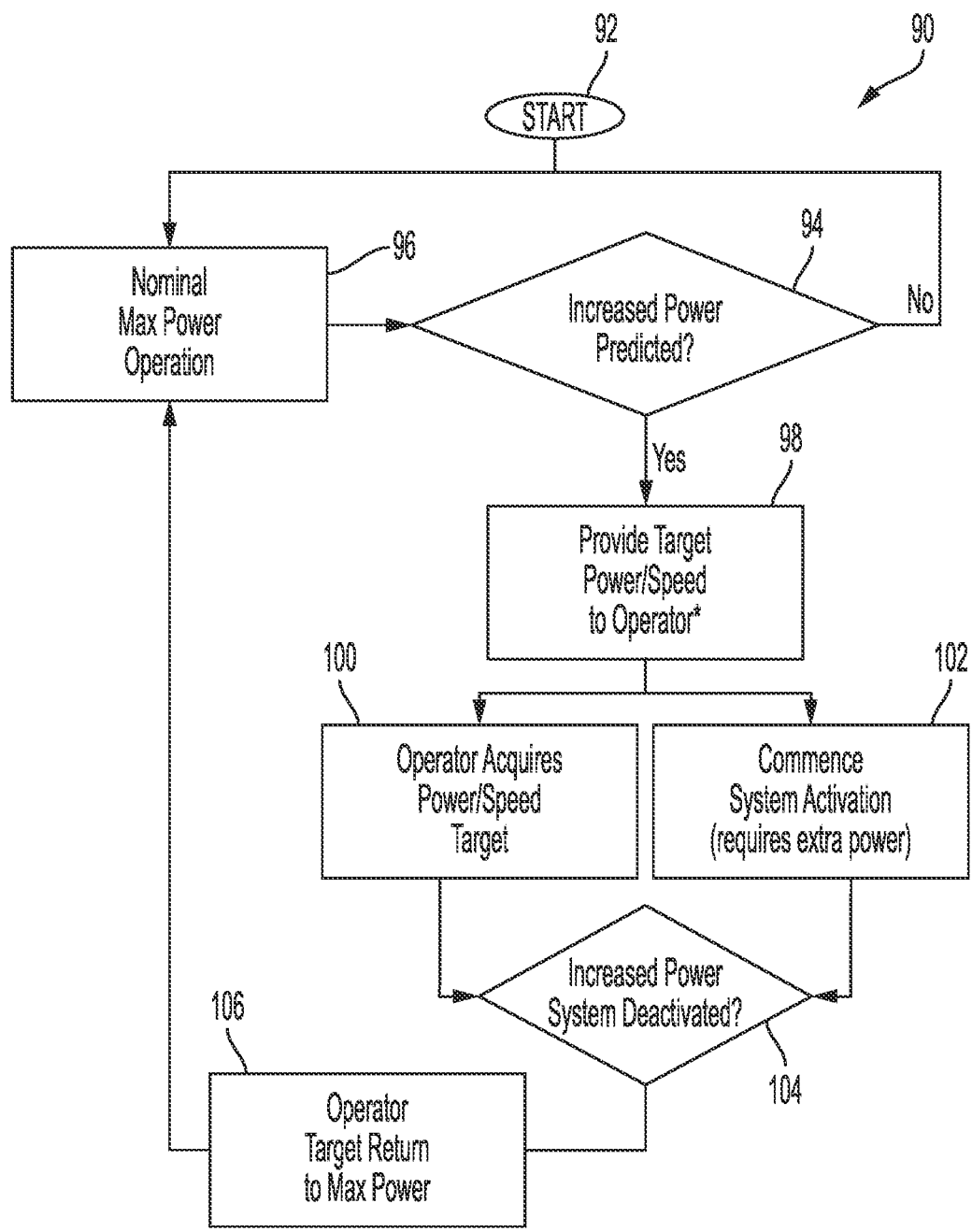
FIG. 3 illustrates one embodiment of an operating process for a harvesting vehicle.

FIG. 3 illustrates one embodiment of an operating process 90 for the vehicle 10 to manage the power systems 46 while harvesting crop and unloading the harvested crop. The process 90 is a semi-automated or manual operation that begins at start block 92. At block 92, the harvester 10 is harvesting crop at a speed that relies on the nominal maximum power, i.e. nominal "max" power. At this speed, the harvester is moving through a field using the nominal maximum power that is determined to be the power at which the vehicle operates during a harvesting operation while not unloading crop or being prepared for unloading crop. The nominal maximum power is determined according to one or more of the type of vehicle, the type and characteristics of the crop being harvested, and the terrain. The nominal maximum power is the factory stock power offered by the manufacturer and is typically not configurable or influenced by an operator or condition. Generally, the nominal maximum power is limited by hardware limitations or product power portfolios.

When the vehicle 10 is in a fully operational mode while harvesting crop, typically a steady state speed, the controller 49 receives the sensor inputs from the rotor pressure sensor 35, the weight sensor 70, the moisture sensor 72, and the mass flow sensor 74. Based on these inputs, the controller 49 determines at block 94, whether an unloading power is needed to unload the grain. Because one or more of the inputs is transmitted in real time to the controller 49, the unloading power, i.e. a predicted power, that is determined for an unloading operation by the controller 49 prior to the unloading operation. The predicted power is anticipated based on current operating conditions of the harvester 10 and power needed to unload grain. In other embodiments, predicted power is based on current harvesting power and also future operating conditions including power required to unload grain.

If an unloading power is not predicted at block 94, the harvester proceeds to the nominal max power operation at block 96. If, however, the unloading power is found to be needed within a certain amount of time, a target power, that determines a target speed required during the harvesting operation while unloading, is determined at block 98. Once determined, the power or speed for the unloading of grain (identified herein as "target power") is displayed to the operator on the display 60. In another embodiment, the manual selection by the operator is selectable via a configurable setting. In addition, the current operating power and/or speed, based on the nominal max power, is also displayed. Once the target power/speed is displayed, the operator adjusts the speed adjuster 62 to change either the current power level or current speed, i.e. the nominal maximum power, to the power target at block 100. After the operator acquires the power target, the controller 49 applies an amount of unloading power needed to activate the auger 44 and to unload the grain from the tank 43 at block 102. As the nominal max power is reduced to the target power, the unloading power becomes available. The unloading power is directed to the auger for its unloading operation. While unloading the crop, the vehicle 10 may continue a harvesting operation at a reduced speed, while the wagon or truck receiving the grain moves alongside the vehicle 10. In one embodiment, the reduced nominal maximum power and the unloading power, when combined, are about the same as the nominal maximum power.

Once the harvester 10 has completed the unloading operation, the unloading power is reduced to zero at block 104. Once the controller 49 has deactivated the unloading power, a new nominal maximum power is displayed on the display 60. In one or more embodiments, the new nominal max power is the same as the most recent nominal max power or is different depending on current operating conditions. Once displayed, the operator returns the harvester 10 to the new nominal max power with the speed adjuster 62 at block 106. In the manual mode, the processor is configured to sense when tank is empty, power demand is low, or the operator has disabled the unloading system to automatically return to nominal maximum power. In some embodiments, the operator input device 17 includes a user input to override and disable the power reduction logic used to unload crop. When overridden, the operator manually reduces power prior to unloading.

Figure 4:
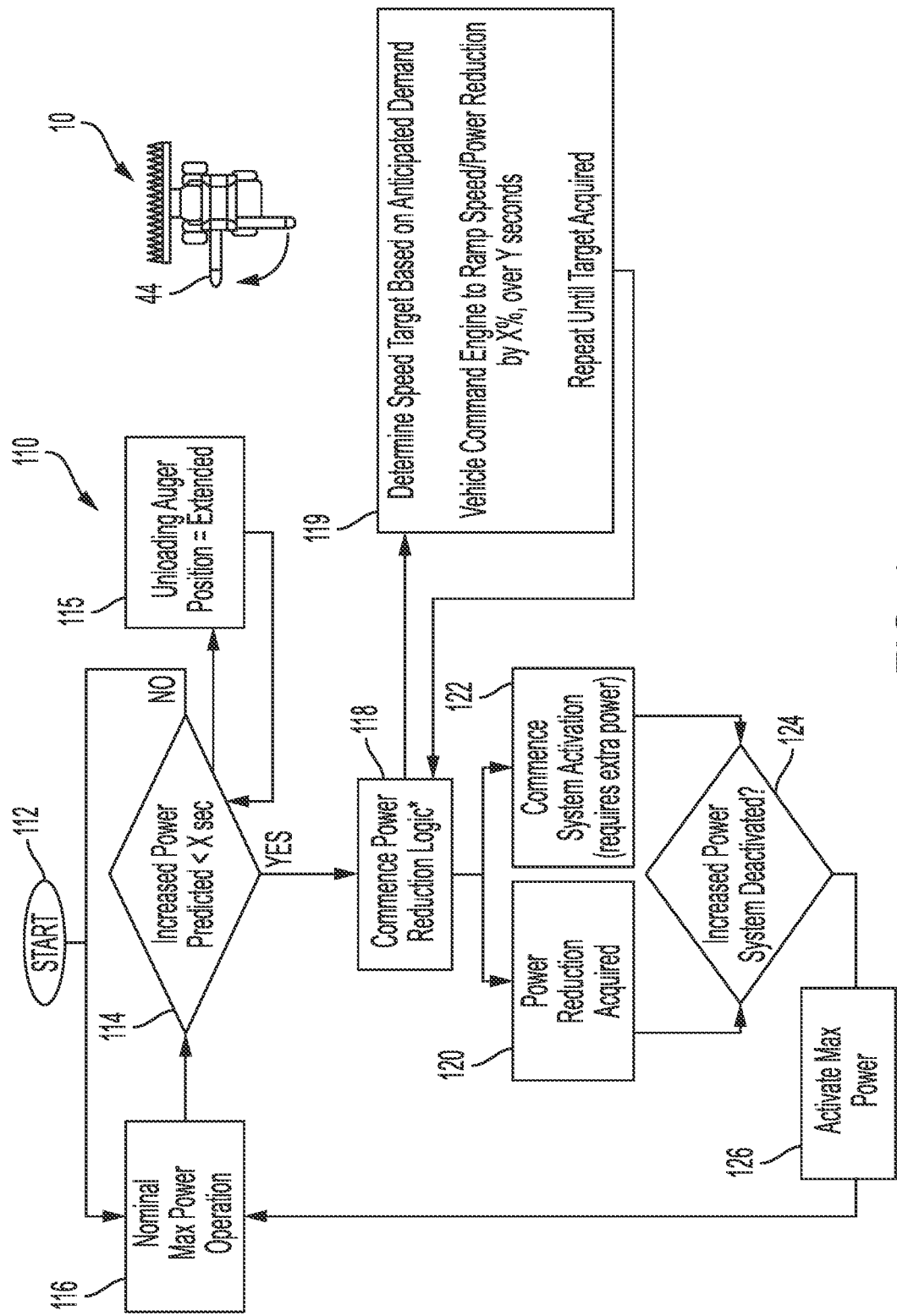
FIG. 4 illustrates one embodiment of an automated operating process for a harvesting machine to manage the power systems.

FIG. 4 illustrates one embodiment of an automated operating process 110 for the vehicle 10 to manage the power systems 46 while harvesting crop and unloading the harvested crop. The automated process 110 that begins at start block 112 where the harvester 10 is harvesting crop, while not unloading grain, at a speed based on the nominal maximum power, i.e. nominal "max" power as described above for block 92. When the vehicle 10 is in a fully operational mode while harvesting crop, as described above, the controller 49 determines at block 114, whether an unloading power is needed to unload the grain at block 114. The unloading power is predicted to be needed at a time X which is based on a determination made at block 115 that considers the time at which the auger must be extended for the unloading operation. (See harvester 10 with auger 44 in the extended position.) The auger 44, however, is not moved to the extended position until the power for unloading is predicted to be needed in X or fewer seconds, wherein X is a predetermined value stored in the memory 78. In one embodiment, the value of X is about 10 seconds, which is based on the amount of time it takes the auger to move from a closed position to the unloading position. In other embodiments, the value of X is several minutes based on map based farming (MBF) or predictions of unloading needs. If the unloading power is required at block 114, the controller 49 automatically moves the auger position to an extended position (the unloading position) at block 115. In one or more embodiments, the value of X ranges from a time period of 10 seconds to 2 minutes. MBF is one type of a predictive analytics systems that is used to determine unloading needs by a prediction based analysis. Other types or predictive systems are contemplated.

In other embodiments and relying on the map data and other inputs, the occurrence of consecutive fully loaded onboard grain tanks is predicted. Consequently, multiple consecutive unloading positions of the harvester within a field are determined ahead of time where two or more unloading positions are determined. In a further embodiment, the locations for unloading the harvester for an entire field is predicted so that unloading locations are predetermined to optimize harvester speed and unloading locations. In some large scale harvesting operations, more than one grain receiving truck is used. Once full, a first grain receiving truck moves to a grain storage location and a second and different grain receiving truck is used to receive grains being unloaded. Such systems are known as "automated logistics systems" that provide traffic planning in combination with predictions of unloading, including one or more locations and one or more times of unloading. In one example, for instance, an area of the field where excess power is available, such as lower crop yields or easier terrain, for unloading is predetermined.

If an unloading power is not predicted at block 114, the harvester proceeds to the nominal max power operation at block 116. If, however, the unloading power is found to be required within a certain amount of time, power reduction logic resident in the controller 49 is started by the controller 49 at block 118. The power reduction logic at block 118 determines a speed target based on the anticipated power demand to unload the grain at block 119. Once the speed target is determined, the controller 49 determines a vehicle engine command that reduces the engine speed/power by X percent over a period of Y seconds. The controller 49 repetitively determines the reduction in speed until the target speed of the vehicle, based on target power is acquired, so that the reduction in speed is not immediate, but occurs over a period of time. Once the reduction in speed is determined to arrive at the target speed, the controller 49 determines that the power reduction is acquired at block 120. At substantially the same time, the system activation is commenced to deliver power for unloading the grain using the auger 44 of while power reduction for the vehicle speed is reduced to unload the grain at block 122. Once the harvester 10 has completed the unloading operation, the controller 49 directed the vehicle to resume the harvesting speed at block 124. A new nominal max power is determined at block 126. In one or more embodiments, the new nominal max power is the same as the most recent nominal max power or is different depending on current operating conditions.

Figure 5:
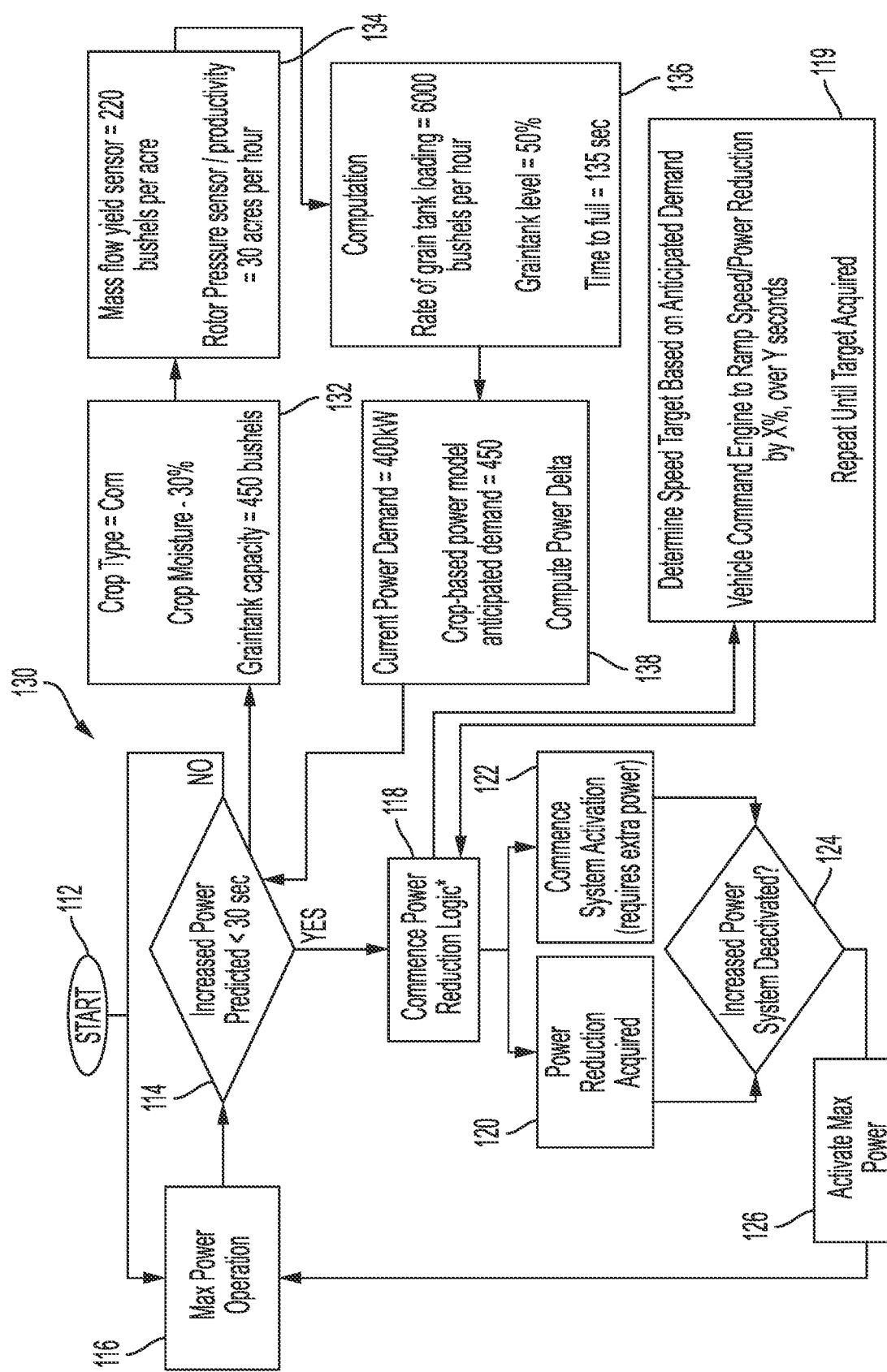
FIG. 5 illustrates one example of a process used in the processing of corn with a harvesting machine.

FIG. 5 illustrates one example of a process 130 used in the processing of corn as the grain. As seen in FIG. 5, the example process includes the blocks 112, 114, 116, 118, 120, 122, 124, and 126, as seen in FIG. 4. At block 114 of FIG. 5, however, the increased predicted unloading power is determined for a time period of 30 seconds before the crop is unloaded. In this embodiment, the crop type is corn, the crop moisture is thirty (30) percent and the grain tank 43 capacity is 450 bushels at block 132. The rotor pressure sensor 35 provides in input to determine the crop yield of 200 bushels per acre to the processor 49 at block 134. The machine area counter provides a value of 30 acres per hour. A computation is made by the processor 76 at block 136 to determine an amount of time to fill the tank 43 at the current productivity. Using the value of 200 bushels per acre and the value of 30 acres per hour, the processor 76 determines that the rate of grain tank loading is 6000 bushels per hour. With the grain tank 43 level currently at 50 percent, it is determined that the time to a full tank is about 135 seconds.

At block 138, the controller 49 determines that the current power demand for harvesting crop prior to unloading, is about 400 kW, i.e. the nominal maximum power. Based on the crop type being corn as detailed in blocks 132 and 134, a crop based power model determines that the anticipated (predicted) demand is 450 kW. By computing a delta between current power demand and anticipated power demand, a power delta of 50 kW is determined. Consequently, to achieve unloading of corn without exceeding the nominal max power of 400 kW, the currently power demand is reduced to 350 kW for the harvesting operation while 50 kW is provided for unloading of corn. In one or more embodiments, the crop based power model includes crop types, crop conditions such as moisture and test weight, harvester size and discharge system specifications. The power model, in different embodiments, is a table stored in memory, such as a look-up table. The stored models are accessed to determine an allocated boost power for discharging crop.

Once the power delta is computed, the process returns to block 114 as described above. If the increased power demand is required as determined at block 114, the process moves to block 118. At block 118, the target is acquired as described above. Additional steps of the process are completed at blocks 118, 120, 122, 124 and 126 as described above.

Figure 6:
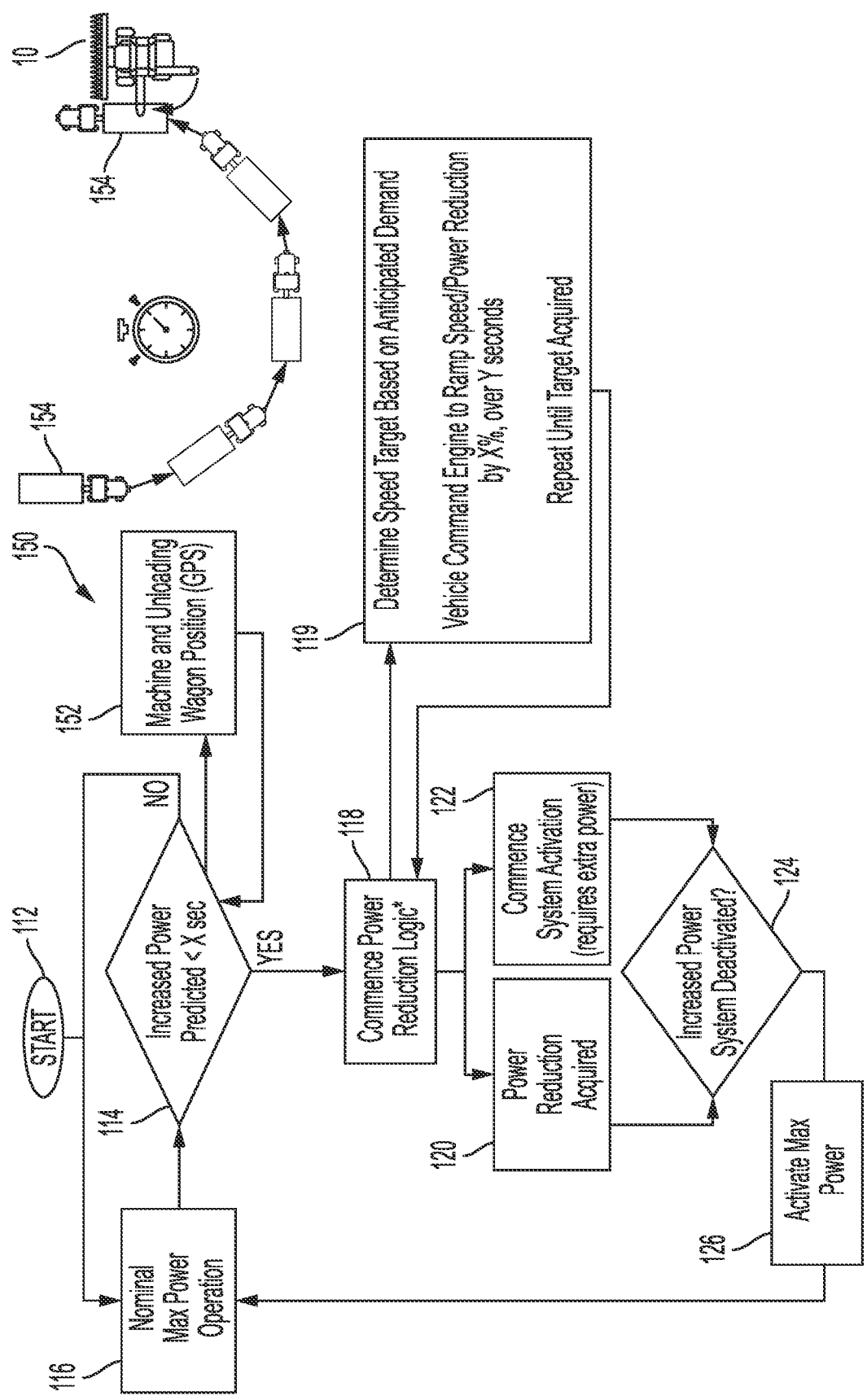
FIG. 6 illustrates one embodiment of a process including a time to discharge harvested crop based on a traffic planning schedule.

In another embodiment as illustrated in FIG. 6, a process 150 includes a time to unload based on a traffic planning schedule. In this embodiment, the example process includes the blocks 112, 114, 116, 118, 120, 122, 124, and 126 as seen in FIG. 4. Block 152, however, provides a position input to determine the amount of time used in block 114 of FIG. 4, for instance, using a global positioning system (GPS) to determine the position of an unloading wagon 154 with respect to a position of the harvester 10. The position of the harvester 10 and the unloading wagon 154 are both determined by the GPS system as is understood by those skilled in the art. Since the crop characteristics as well as rate of grain tank loading are known, a time at which the tank 43 is sufficiently full for unloading can be predicted. Once this time is known at block 114, the unloading wagon 154 is dispatched to the harvester 10 where it intercepts the harvester 10 for unloading of the crop. Estimations of position and travel speed and direction for both the wagon and harvester are used to compute the intercept time to appropriately command the power reduction in time to commence unloading. The harvester may unload the crop even if the tank is not full.

Figure 7:
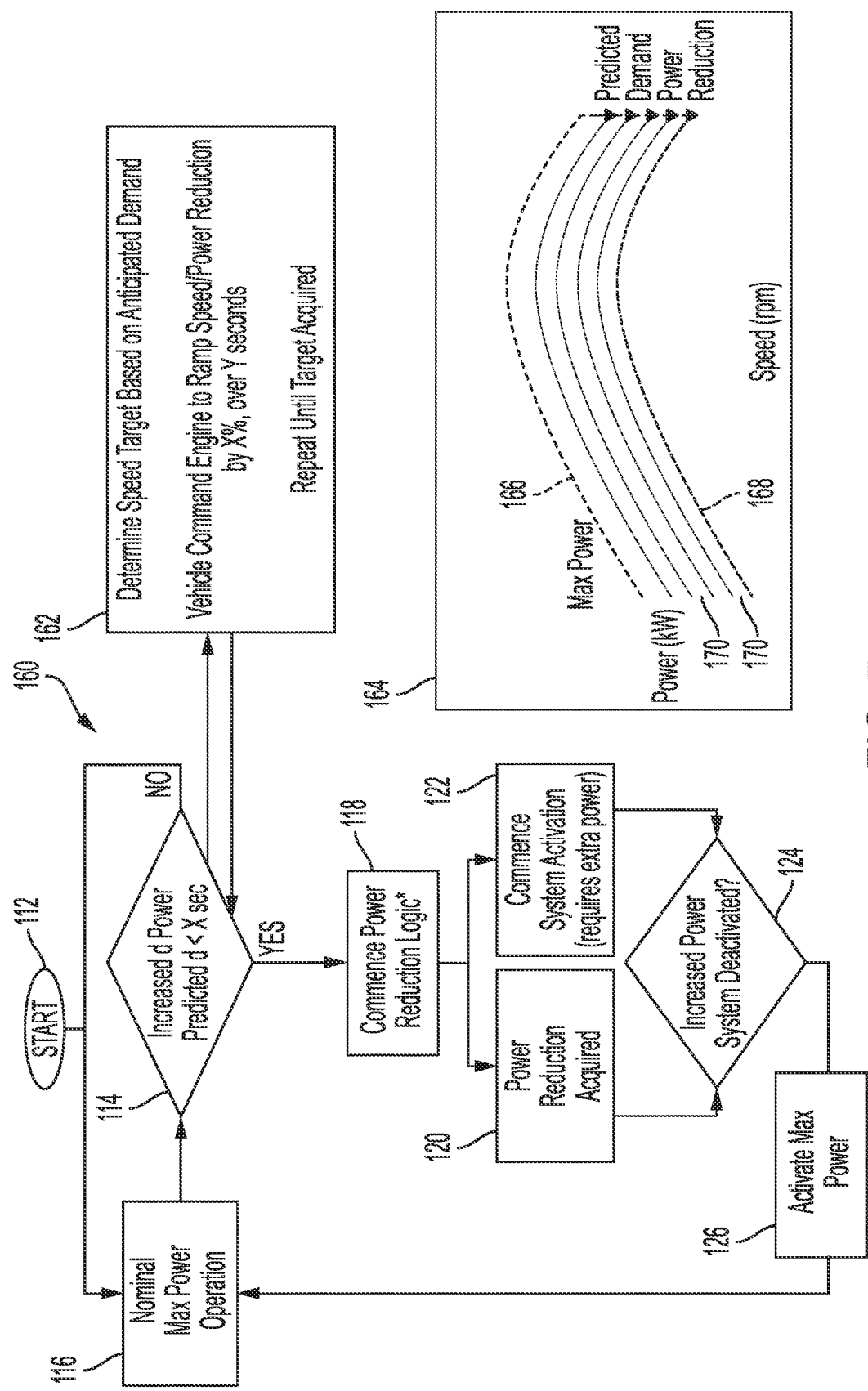
FIG. 7 illustrates a process for power reduction in a harvesting machine.

In an additional embodiment as illustrated in FIG. 7, a process 160 includes a power reduction process. In this embodiment, the example process includes the blocks 112, 114, 116, 118, 120, 122, 124, and 126 of FIG. 4. Block 118, however, illustrates that the power reduction logic includes determining a speed target based on anticipated demand at block 162 that utilizes a plurality of power reduction curves 164. As stated in block 162, the target is acquired iteratively as the processor 76 moves from a max power curve 166 to a target power curve 168. The process is iterative as the processor 76 accesses power curves 170 stored in memory 78, which are located between the max power curve 166 and the predicted power curve 168. Each of the power curves 166, 168 and 170 are stored in a lookup table stored in the memory 78. The curves have been predetermined based on the type of harvester. In another embodiment, each of the power curves are calculated during the harvesting operation. By moving from one stored power curve to the next stored power curve, the target power curve is determined and processing power is reduced, when compared to the power curves that are calculated. In other embodiments, a determination of the target power curve is implemented as an algorithm that uses real-time data received from the various harvester sensors, map data, and GPS information.

Figure 8:
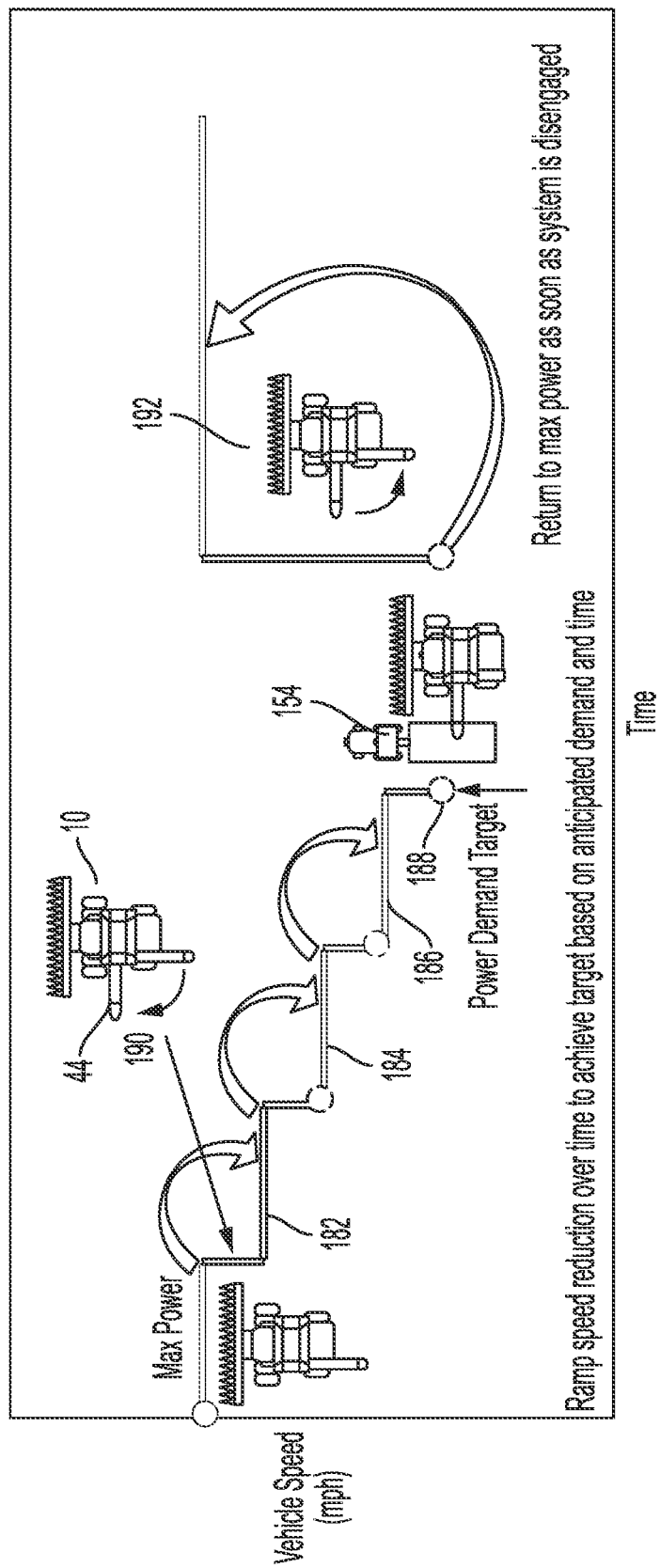
FIG. 8 illustrates a closed loop speed control system using power curves of FIG. 7.

By using the power curves of FIG. 7, a closed loop speed control system of FIG. 8 is provided which gradually reduces the speed of the harvester 10 to the target speed needed to preserve maximum power while unloading the crop. Each of the power curves ramps the vehicle speed downward over a period of time to arrive at the power demand target. Initially, the vehicle 10 is traveling at a speed using the nominal max power 180. The speed is reduced gradually in steps indicated by speed lines 182, 184, and 186, until the power demand target is achieved at power demand target 188. At a transition 190 in speed between speed max power and speed 182, the auger 44 is moved to the unloading position. While the auger 44 is moved to the unloading position at speed 188, the auger 44, in other embodiments, unloads grain based on other types of predictions for unloading timing, such as graintank level using graintank fill level sensors, prior geographic locations, map based unloading used to reduce nominal harvester power and to commence unloading. In one or more embodiments, the graintank fill level sensors includes light sensors, visual or audible alarms, light illumination devices, and site gauges. Once the target power 188 is reached, the wagon 154 is loaded with grain. Once the vehicle 10 has completely unloaded the grain, the auger 44 moves to the closed position 192, as indicated by the arrow, at which point the speed of vehicle increases to the speed provided by nominal max power without the power required for unloading. As soon as the crop tank is empty or the unloading system is deactivated, the auger returns to the closed position and the vehicle returns to harvesting speed.

In one embodiment, when the graintank reaches the full level, an alert prompts the operator to take action and to move the auger to the unloading position to unload. In some embodiments, exterior beacon light located on the harvester are illuminated to warn wagons that crop unloading is imminent. In some cases, the harvester unloads crop at ¾ full for example. In other embodiments, the operator actively monitors that level or crop within the graintank and signals to the wagon that an unloading event will occur. Such an event is an unloading event that is learned and is based on how long it takes for the harvester to have a full graintank and at what location in the field the unloading occurs. In some embodiments, the unloading event is a cyclical event that is reoccurring and identifies a location in the field where unloading will occur.

Figure 9:
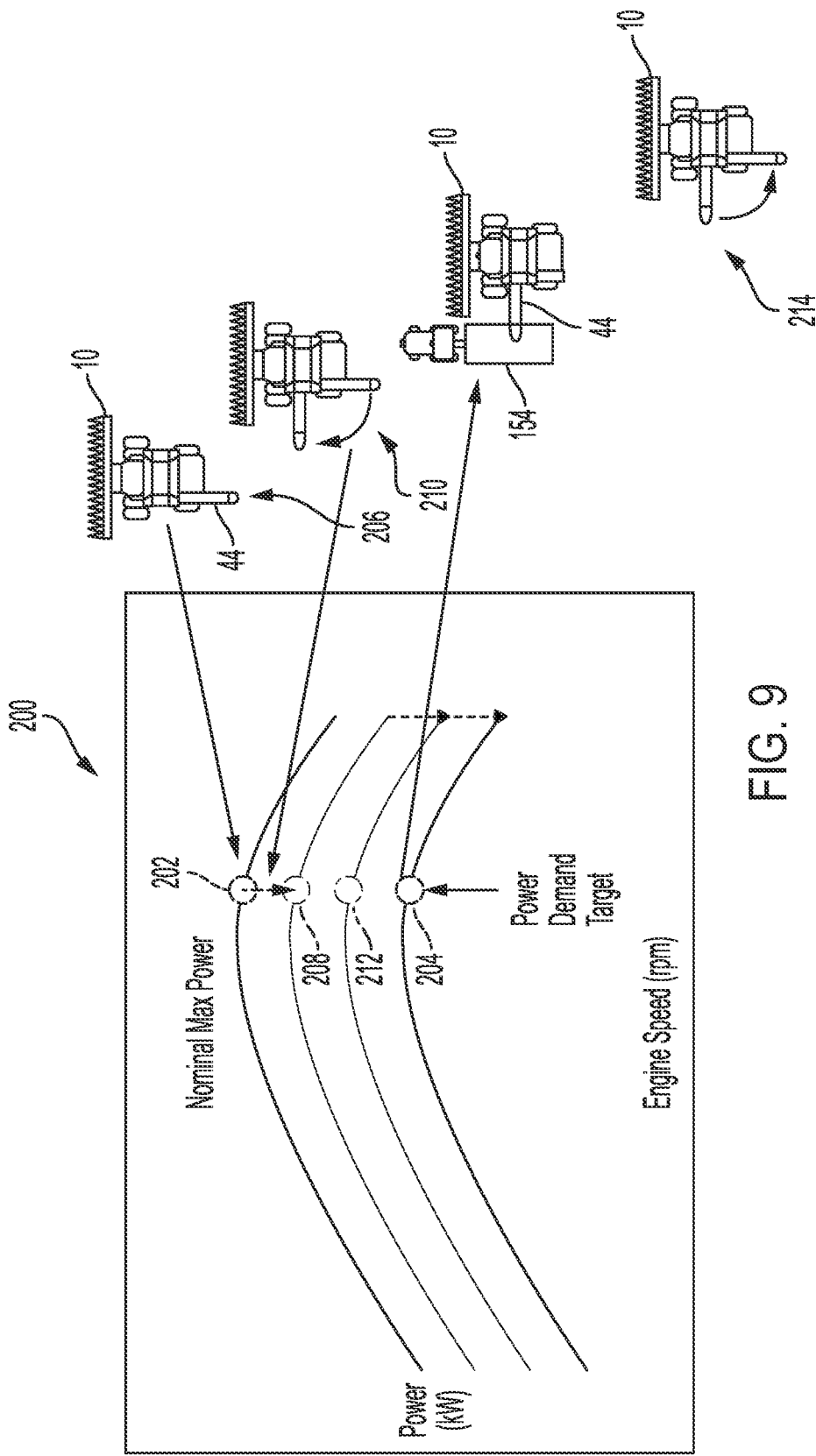
FIG. 9 illustrates one embodiment of a power reduction approach from a nominal max power to a power demand target for a harvesting machine.

FIG. 9 illustrates one embodiment of a power reduction approach 200 from the nominal max power 202 to the power demand target 204. As the vehicle 10 is harvesting crop, the auger 44 is at a harvesting position 206, where the auger 44 is aligned with the traveling direction of the vehicle 10. While the power is reduced to a second power level 208, a signal transmitted from the controller 49 starts the unloading process where the auger 44 moves from the position 206 to the unloading position 210. As the power continues to be reduced from a third power level 212 to the power demand target, the auger is fully deployed which the speed of the vehicle 10 is reduced. In other embodiments, any number of power levels are contemplated, including more than three power levels. Once the power demand target is achieved, the auger 44 begins to unload the grain from the tank 43. After the tank is unloaded, which is recognized by one or more of the sensors 70 of FIG. 2, the auger 44 moves to the harvesting position 214. In other embodiments, the auger 44 moves to the harvesting position 214 based on grain tank level and unloader deactivation. At this point, the vehicle 10 returns to the nominal max power 202. In one embodiment, the vehicle 10 resumes speed to the harvesting speed with the processor 49 setting the processing speed to the speed at the nominal max power. In another embodiment, the return to harvesting speed is ramped up by moving from one of the power curves to a next power curve.

Figure 10:
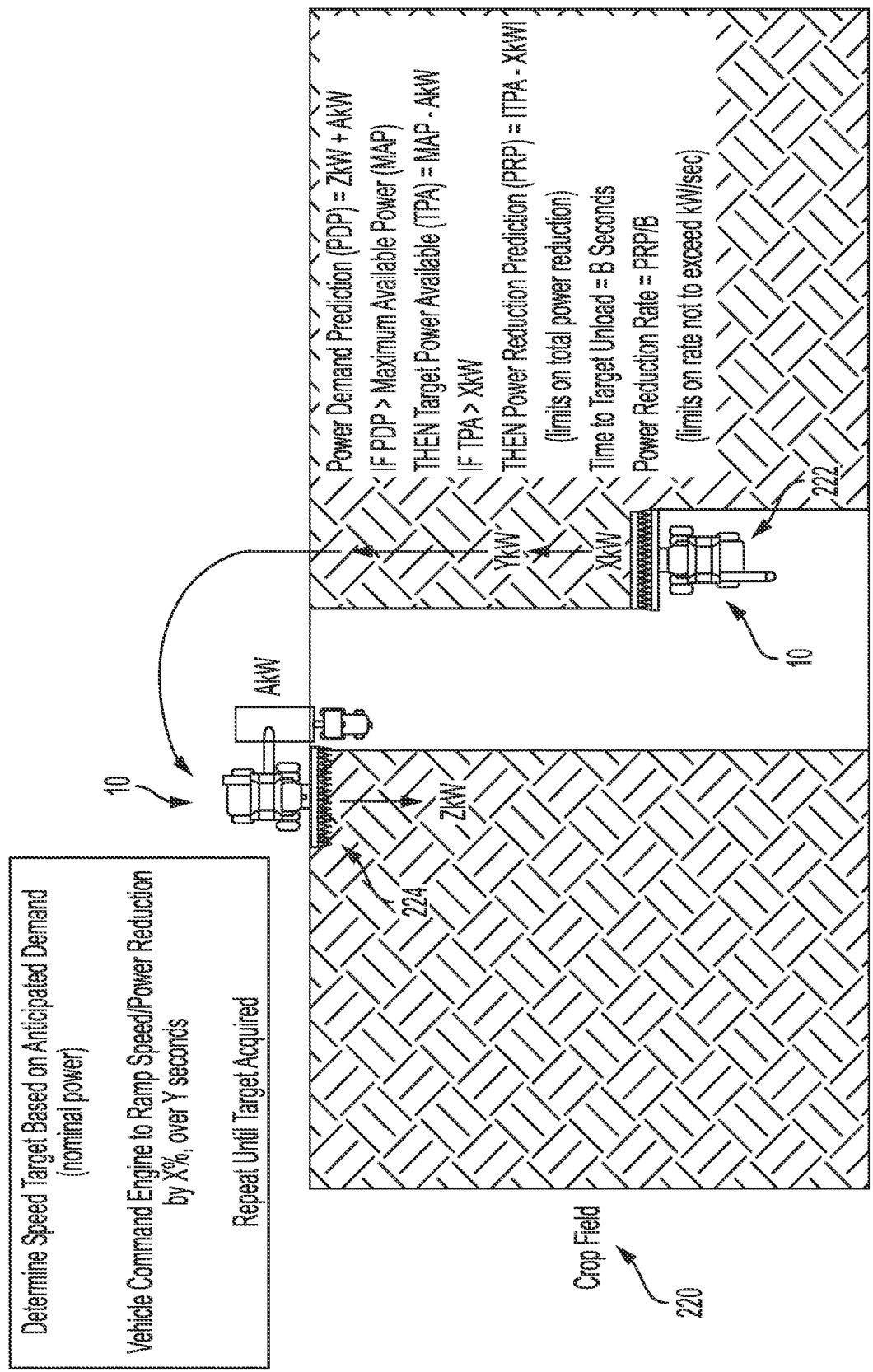
FIG. 10 illustrates one embodiment of a process to determine a target power based on anticipated demand.

FIG. 10 illustrates one embodiment of a process to determine a target power based on anticipated demand. In this embodiment, the nominal max power is based on the changing conditions the harvester 10 experiences as it moves through a crop field 220 during a harvesting operation. This harvesting power consumption changes based on field conditions and crop conditions. As described above, map data, which includes one or more of topography, soil types and conditions, and vegetative index or biomass/crop density, is used to leverage the information available throughout the cropping production cycle, such as soil preparation, seeding, application, surveying and monitoring, irrigation, and harvesting. While the maximum harvesting power available changes throughout the field during cropping, this maximum harvesting power is considered with respect to the nominal maximum power and power allocation needed for identifying when to unload the crop from the harvester 10. While factory stock power is considered, the available nominal maximum power in this embodiment also depends on the field conditions and crop conditions.

As seen in FIG. 10, the power that will be available for unloading during harvesting is predicted by identifying a current harvest power, a predicted future harvest power, the time to unload, and the power allocation needed to unload. In this embodiment and under some conditions, it is determined that excess power will be available and no reduction in harvesting speed is necessary. In other conditions, however, a power deficiency for unloading is predicted and the power required to unload is determinable. In this condition, the harvesting systems reacts accordingly to meet the identified needs.

FIG. 10 illustrates one embodiment of a process to determine a target power based on anticipated demand. As seen in FIG. 10, the harvester 10 moves through the field 220 at a position 222 prior to unloading the harvested crop. At position 222, a power prediction is made based on the power required by the harvester 10 at a position 224 where the harvester harvests crop while unloading the crop. This is a power demand prediction (PDP). The power required to harvest crop at position 224 is ZkW plus the power required by the auger to unload which is AkW. If the PDP is greater than the maximum available power (MAP) based on map data, then the controller determines the target power available (TPA) which is equal to MAP minus AkW, the power required by the auger to move to the unloading position and to unload the crop. If the TPA is greater than the current nominal maximum power, XkW, then the power reduction prediction (PRP) is equal to the absolute magnitude of TPA-XkW. This determined value is a limit on total power reduction. At this point, the time to start unloading crop is a known quantity based on the amount of crop located in the tank 43. In one example, if this time is B, a power reduction rate is determined to be the PRP divided by the time B. The reduction rate reduces the value of XkW over a period of time. The reduction rate, in different embodiments, is a stepped reduction such as illustrated in FIG. 9 or is a continuous reduction, which is not stepped. In one embodiment, the memory 78 includes a stored limit value of the reduction, which limits the rate to not exceed a value of kW/second. The stored limit value reduces or prevents the likelihood of the harvester decelerating too rapidly. The power reduction is therefore a percentage of XkW over Y seconds based on boost need to unload the crop. The letters above that modify "kW" represent actual values of kilowatts (kW) used by the processor 76.

In one or more embodiments, the harvester includes a reserve power boost value for unloading that is based on the type of grain. For instance, the memory includes a stored value of 50 kW reserve boost in corn, and 40 kW reserve boost in wheat. In this way, the amount of power required for harvesting (while unloading) is determined based on these stored values. In other embodiments, the amount of power required for unloading is a learned value based on sensing of the load demand. In this instance, the amount of power required by the unloading device, the auger for instance, is monitored by a sensor that senses power required by a motor for instance. This value and later sensed valued are stored in memory. The power demand required by the load is therefore acquired over time and used instead of a predetermined value. In some harvesting conditions, the reserve boost is available if the current harvesting power does not need to be reduced such that the current harvesting is not impacted. As used herein, the term "learned" means that the amount of power required for unloading is an acquired, perceived, or predicted value that is determined by computation and/or is generated in response to one or more inputs as described herein. Machine sensors or inputs resulting from map based farming are considered in determining the "learned value."

In other embodiments, the maximum power available for use during harvesting could increase before an unloading event is anticipated. For instance, if at the predicted time for unloading the vehicle moves to terrain that requires less power, i.e. moving from hilly terrain to flat terrain, the amount of power available for harvesting while unloading increases, since less power is needed to harvest in the flat terrain. In this case, power required for harvesting decreases while the available power for unloading increases as well to arrive at the maximum power available for harvesting while unloading.

While exemplary embodiments incorporating the principles of the present disclosure have been described herein, the present disclosure is not limited to such embodiments. For instance, while a grain harvester has been described in detail, other crop harvesters, such as a cotton picker and cotton harvester are included. In one example of a cotton harvester or cotton picker, once a bale is complete, a gate is opened where the bale exits from the baler and onto a bale handler. The bale handler is positionable between a relatively upright position and a relatively horizontal position for unloading the bale. An end of the bale handler moves to a position toward the ground where the bale falls for later processing. Consequently, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of controlling work machine power of a work machine during a harvesting operation for harvesting a crop and delivering the harvested crop to an external crop container, wherein the work machine includes an engine, a crop harvester, an onboard crop storage container and a crop discharging system, the method comprising:
monitoring crop harvester power delivered by the engine to operate the crop harvester during the harvesting operation to provide harvested crop;
while monitoring the crop harvester power, determining a discharging power required by the crop discharging system to discharge the harvested crop to the external crop container;
modifying and allocating the crop harvester power based on the determined discharging power; and
delivering the discharging power to the crop discharging system to discharge the crop from the onboard crop storage container to the external crop container.

2. The method of claim 1 further comprising determining harvested crop remaining to be discharged from the onboard crop storage container, and reducing the discharging power and increasing the crop harvester power based on the remaining harvested crop to be discharged.

3. The method of claim 2 further comprising prior to delivering the discharging power required to discharge the harvested crop to the external crop container, reducing the crop harvester power as the discharging power is increased.

4. The method of claim 3 wherein determining the discharging power required by the discharging system includes determining an amount of crop in the onboard crop storage container.

5. The method of claim 4 wherein the delivering the discharging power to the crop discharging system includes reducing the crop harvester power prior to increasing the discharging power.

6. The method of claim 5 wherein the modifying the crop handler power includes reducing the crop handler power over a period of time and increasing the discharging power once the reduced harvester power reaches a determined value.

7. The method of claim 6 wherein the modifying the crop handler power includes modifying the ground speed of the vehicle to increase the amount of power available for the discharging power.

8. The method of claim 7 wherein the modifying the ground speed of the vehicle includes modifying the ground speed of the vehicle over the period of time.

9. The method of claim 7 wherein the modifying the ground speed of the vehicle includes manually modifying the ground speed of the vehicle with a user control.

10. The method of claim 9 wherein the manually modifying the ground speed includes displaying a target ground speed or power on a user interface and manually modifying the ground speed to the displayed target ground speed.

11. The method of claim 7 wherein the modifying the ground speed of the vehicle includes automatically modifying the ground speed of the vehicle over the period of time.

12. A work machine comprising:
a supporting structure;
a harvesting assembly coupled to the supporting structure;
an onboard container coupled to the supporting structure and configured to contain harvested crop harvested by the harvesting assembly;
a crop discharging system, disposed at the onboard container and configured to discharge harvested crop from the onboard container;
an engine configured to provide harvesting power to the harvesting assembly and to provide discharging power to the crop discharging system;
a controller operatively connected to the harvesting assembly and to the discharging system, the controller including a processor and a memory, wherein the memory is configured to store program instructions and the processor is configured to execute the stored program instructions to:
monitor crop harvester power delivered by the engine to operate the crop harvester during the harvesting operation to provide harvested crop;
while monitoring the crop harvester power, determine a discharging power required by the crop discharging system to discharging the harvested crop from the onboard crop container;
modify the crop harvester power based on the determined discharging power; and
deliver the discharging power to the crop discharging system to discharge the crop from the onboard container.

13. The work machine of claim 12 wherein the processor is further configured to determine harvested crop remaining to be discharged from the onboard container, and reduce the discharging power and increase the crop harvester power based on the remaining harvested crop to be discharged.

14. The work machine of claim 13 wherein the processor is further configured to prior to deliver the discharging power required to discharge the harvested crop, reduce the crop harvester power as the discharging power is increased.

15. The work machine of claim 14 further comprising wherein the deliver the discharging power to the crop discharging system includes reducing the crop harvester power prior to increasing the discharging power.

16. The work machine of claim 15 further comprising wherein the modify the crop handler power includes reduce the crop handler power over a period of time and increase the discharging power once the reduced harvester power reaches a determined value.

17. The work machine of claim 16 wherein the modify the crop handler power includes modify the ground speed of the vehicle to increase the amount of power available for the discharging power.

18. The work machine of claim 16 wherein the modify the ground speed of the vehicle includes modify the ground speed of vehicle manually with a user control.

\* \* \* \* \*